Nov. 18, 1958     A. R. NIELSEN     2,860,801
COATED SYNTHETIC RESIN CONTAINER
Filed March 23, 1956

Synthetic Resin Container

Coating-copolymer of vinyl chloride, vinyl acetate & vinyl alcohol & an alcoholic type urea-formaldehyde resin.

INVENTOR
Alvin R. Nielsen
BY
Burns, Drane, Benedict & Ison
ATTORNEYS

United States Patent Office 2,860,801
Patented Nov. 18, 1958

2,860,801

COATED SYNTHETIC RESIN CONTAINER

Alvin R. Nielsen, Hartford, Conn., assignor to Plax Corporation, Bloomfield, Conn., a corporation of Delaware Application March 23, 1956, Serial No. 573,559

20 Claims. (Cl. 215—1)

This invention relates generally to synthetic resin articles and more particularly to synthetic resin containers which have enhanced resistance to permeation by fluids. More specifically, the invention is directed to synthetic resin containers such as polyethylene containers and bottles, a surface of which is modified by application of an adherent coating thereto to prevent or reduce the rate of permeation of the synthetic resin material by many of the commonly employed fluids, particularly organic liquids.

Synthetic resin containers and bottles as, for example, polyethylene bottles, have become widely popular as a packaging means for various liquids such as deodorants, hair preparations, cosmetic preparations, medicinal preparations, and the like. In particular, polyethylene has been and is widely used in the production of squeeze bottles for the distribution of such preparations in that it is relatively inert, has the necessary flexibility to function as a squeeze bottle, and can be easily fabricated in quantity at a reasonable cost. Unmodified polyethylene is entirely satisfactory for a wide variety of materials. However, polyethylene and other synthetic resins which are usable as containers are permeable to many organic liquids, including a large number of conventional organic solvents which are widely used in fluid preparations for which the polyethylene bottle or container is highly desirable. Representative chemicals, for example, which permeate with various degrees of rapidity through polyethylene at room temperature, include the straight chain hydrocarbons, the aromatic hydrocarbons, esters, ketones, oils and various other non-polar fluids. Consequently, because of this high permeability characteristic of polyethylene and other synthetic resin materials from which containers are desirably fabricated, the use of these materials has of necessity been restricted to those products to which the resin is substantially impermeable. The permeability characteristics of polyethylene with respect to certain of these chemicals has resulted in polyethylene bottles being rejected for use in applications where, due to its flexibility and ease of fabrication, it might otherwise be employed to great advantage.

It has previously been suggested that polyethylene bottles be lined with such materials as polyvinyl alcohol, polyvinyl chloride and copolymers of polyvinyl chloride and polyvinyl acetate to obtain an oil resistant film which will resist permeation by oily materials. While such liners have been moderately successful, there is no liner material currently employed which will form an adherent coating on a polyethylene surface and which will satisfactorily resist permeation by a variety of organic fluids, particularly the various oils employed in lubricating, medicinal and cosmetic applications.

In view of the problems as above set forth relating to the use of synthetic resin containers and bottles, particularly those produced from polyethylene, it is a primary object of this invention to provide a plastic article which is characterized by enhanced resistance to permeation by a variety of fluids.

It is another object of this invention to provide a container or bottle formed from a synthetic resin, a surface of which carries an adherent coating which will prevent permeation of the resinous container structure by a variety of commonly employed organic fluids.

It is an additional object of this invention to provide a polyethylene bottle having an adherent resinous coating on the interior and/or exterior surface thereof which is characterized by substantial freedom from permeation by a variety of organic fluids, particularly commonly employed lubricating oils, medicinal oils, and the essential oils employed in cosmetic preparations.

It is a more specific object of the present invention to provide a polyethylene bottle having an adherent synthetic resin coating which is substantially impermeable to many organic fluids capable of substantially permeating the polyethylene bottle walls in the absence of such coating.

Generally described, the present invention comprises a plastic article having a surface characterized by enhanced resistance to permeation by fluids, which comprises a plastic surface having an adherent coating of a composition containing a copolymer of vinyl chloride, vinyl acetate and vinyl alcohol and an alcoholic type urea-formaldehyde resin. It has been found that such coatings and linings for plastic articles and containers, and particularly those formed from polyethylene, are adherent to plastic surfaces and prevent or substantially reduce permeation of the structure by many fluids, particularly the straight chained hydrocarbons inclusive of oils and oil-containing preparations for which relatively small plastic containers are highly desirable.

The vinyl copolymer will desirably include from about 75% to about 95% of vinyl chloride, from about 2% to about 10% of vinyl acetate and from about 3% to about 15% of vinyl alcohol. Especially preferred is a composition containing about 90% of vinyl chloride and minor proportions of vinyl acetate and vinyl alcohol.

The urea-formaldehyde resin employed in the coating composition of the invention is the so-called alcoholic type resin which, in its intermediate stages of cure is soluble in organic solvents. The alcoholic type resin is prepared by reaction of an intermediate urea-formaldehyde condensate with an alcohol, such as butyl, amyl or octyl alcohol, to form an ether type compound. When this ether linkage-containing compound is heated at elevated temperatures or catalyst cured, further condensation occurs with evolution of alcohol. The preferred coating composition of the invention is formulated by admixing Uformite F240 with the vinyl polymer and a suitable solvent. Uformite F240 is a urea-formaldehyde resin produced by Rohm & Haas Company, and is supplied in the form of a solution of 60% of an intermediate condensate dissolved in 40% xylol-butanol (1:1.5).

The vinyl polymer and the urea-formaldehyde resin may be admixed over a wide range of proportions. Excellent results have been obtained with compositions containing from 20 to 90% of the vinyl polymer and from 80 to 10% of the urea-formaldehyde resin. Greatest flexibility is obtained as the proportion of the vinyl copolymer is increased.

The vinyl copolymer and the urea-formaldehyde resin in the form of an intermediate condensation product are admixed in the desired proportions in a suitable solvent medium, such as toluene or methyl ethyl ketone, and the solution is applied to the surface to be coated by conventional techniques, such as by spraying, or manually by at least partially filling the bottle followed by suitable manipulative and draining steps to insure the application of an even coating to the interior surface. If the coating is applied to the exterior surface of the article, it need simply be immersed in a bath of the coating material and allowed to drain. Exterior coatings may, of course, be applied by spraying techniques.

The coating or lining is then cured in situ by subjecting the coated article to a curing temperature for a period of time necessary to produce the desired chemical reaction. Desirably the coating will be cured at a temperature of 160° to 200° F. for a period of about 30 minutes to two hours. Shorter periods of time may obviously be employed with higher curing temperatures. The curing time and temperature will also be varied by the amount and type of catalyst or hardening agent. Conventional condensation catalysts used by the art may be employed, such as sulfuric acid. Curing may be effected by heat alone, or by irradiation alone, or by irradiation in conjunction with heat and/or catalyst. Irradiation will not only effect or accelerate conventional addition, cross-linking and condensation reactions, but often will promote graft polymerization between the monomer and the polymeric substrate, thus greatly improving the bond between coating and substrate. The softening point of the plastic being coated generally constitutes the upper limit of the curing temperature and for unmodified polyethylene, this upper limit is about 220° F.

It has been determined that coatings or liners formed from the vinyl copolymer alone are soluble in and permeated by such commonly employed fluids as oils employed for lubricating, cosmetic or medicinal applications and are thus unsatisfactory. Linings formed from the urea-formaldehyde condensation product alone are not soluble in these oils but exhibit unsatisfactory flexibility and permit excessive permeation of these materials during extended storage. When the two materials are combined in accordance with the present invention, however, and cured in situ, the resulting coating or lining is not soluble in oils, has greatly reduced permeability to oils and has the flexibility requisite to use in squeeze bottle applications.

It is often desirable to pretreat the plastic substrate in order to promote enhanced adherence of the coating or lining material, particularly where the coated or lined surface may be subject to repeated flexing as in squeeze bottle applications. In United States Reissue Patent 24,062 to Horton, it is disclosed that improved adherence of polar compounds may be effected by treating the surface to be printed, lined or coated with a solution of sulfuric acid and a dichromate. United States Patents 2,715,075, 2,715,076 and 2,715,077 to Wolinski disclose that desired surface modification may be obtained by treatment with ozone, nitrous oxide or mixtures of the two. Suitable surface modification may also be obtained by flame treating the surface to be printed, coated or lined, as shown in United States Patents 2,632,921 and 2,704,382 to Kreidl. All of these treatments involve the oxidation of the plastic surface and in many instances involves the conversion of an initially hydrophobic surface to a hydrophilic surface.

In the accompanying drawing illustrative embodiments of the invention are presented.

Figure 1:
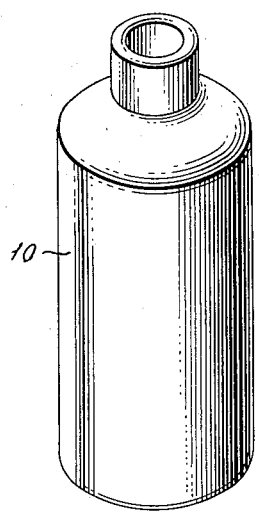
Fig. 1 is an elevational view of a conventional "Boston round" polyethylene bottle 10 which has not been modified in accordance with the invention.
Figure 2:
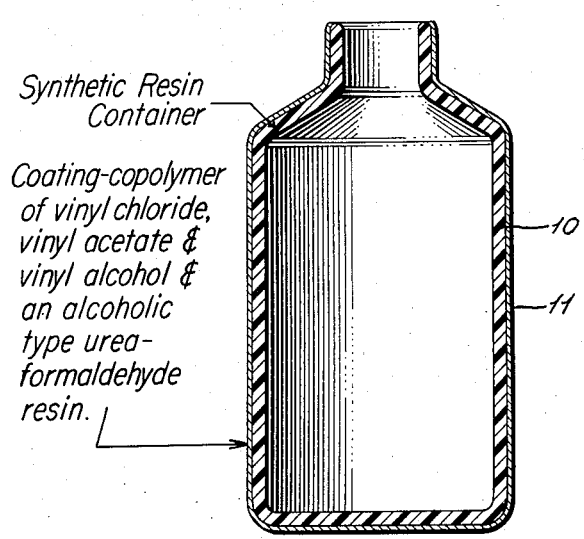
Fig. 2 is a sectional view of a similar polyethylene bottle 10 having a continuous external coating 11 in accordance with one embodiment of the invention.
Figure 3:
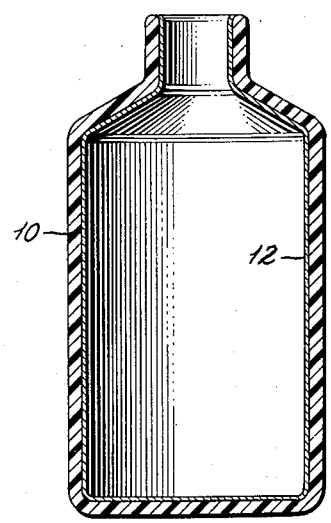
Fig. 3 is a sectional view of a similar polyethylene bottle 10 having a continuous internal lining 12 in accordance with another embodiment of the invention.
Figure 4:
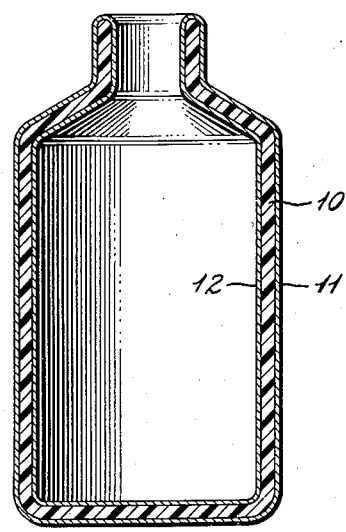

Fig. 4 is a sectional view of a similar polyethylene bottle 10 having both a continuous exterior coating 11 and a continuous interior lining 12 in accordance with a further embodiment of the invention.

Having generally described the invention, the following examples are presented for purposes of illustration of various embodiments thereof. All of the surfaces coated were preliminarily treated with a sodium dichromate-sulfuric acid solution or were flame treated prior to the coating operation to render the coatings more adherent. The polyethylene bottles employed in Examples 2, 4, 7, 8 and 10 were the well-known Boston round type. In the examples, weight loss is expressed as grams per day per bottle unless otherwise specified.

*Example 1*

A coating solution was prepared as follows: One hundred grams of the copolymer of 91% vinyl chloride, 3% vinyl acetate, 6% vinyl alcohol, was dissolved in a mixture of 200 ml. of toluene and 250 ml. of methyl ethyl ketone. One hundred ml. of a solution of an alcoholic type intermediate condensation product formed by reacting urea formaldehyde and a mixture of xylol-butanol, dissolved in 40% parts by weight xylol-butanol (1:1.5) was then added and stirred until a solution was obtained. The interior surfaces of two ½ ounce polyethylene bottles were coated with this solution by filling the bottles approximately one-half full and pouring the solution from the bottle with an eccentric motion so as to coat the entire interior surface. The bottles were drained for from 60 to 90 seconds and the coatings were cured at 200° F. for 2 hours. Several of the lined bottles, and several unlined similar bottles employed as controls, were filled with a commercial facial cleansing lotion marketed in the form of an oil-in-water emulsion. The bottles were sealed and stored in a 100° F. oven. At the end of 28 days, the weight loss. All of the control bottles had collapsed and exhibited a greasy outer feel, while none of the lined bottles had collapsed or exhibited a greasy outer surface. The lined bottles exhibited a weight loss of only one-half the weight loss of the control bottles.

*Example 2*

Four ounce polyethylene bottles were lined and the linings were cured as in Example 1. These bottles and similar unlined bottles were filled with turpentine and with hexane and stored at 70° F. with the following results in terms of weight loss:

| Test Fluid | Control | Lined Bottle |
| --- | --- | --- |
| Turpentine | 0.290 gm. (365 days) | 0.0045 gm. (84 days). |
| Hexane | 2.2 gms. (60 days) | 0.0037 gm. (60 days). |

*Example 3*

Four ounce polyethylene bottles were lined with the composition of Example 1. The linings were cured for two hours at 190° F. These bottles and similar unlined bottles used as controls were filled with a commercial baby oil and stored at 100° F. for a period of 27 days. At the end of six days, all of the unlined bottles showed severe collapse and exhibited a greasy exterior feel. The lined bottles at the end of the 27 day period exhibited no collapse and the outside surface was normal in appearance and feel.

*Example 4*

Four ounce polyethylene bottles were lined with the composition of Example 1. Part of the linings were applied manually and part by spraying. The linings were cured at 210° F. for thirty minutes. These bottles and similar unlined bottles used as a control were filled with a commercial cream oil hair dressing. Part were stored at 70° F. and part at 100° F. for a period of 32 days. The control bottles collapsed at the end of 28 hours at 100° F. and at 68 hours at 70° F. No collapse or external greasiness was noted in the lined bottles from either group at the end of the 32 day test period.

*Example 5*

One and a quarter ounce polyethylene bottles were lined with the composition of Example 1 and the linings were cured at 190° F. for forty minutes. These bottles and similar unlined bottles used as a control were filled with two commercial household utility lubricating oils and were stored at a temperature of 120° F. for 32 days. All of the unlined bottles collapsed, while none of the lined bottles collapsed during this period. The average weight loss of the oils in the lined and unlined bottles is shown below:

|  | Weight Loss in Grams | |
|---|---|---|
|  | Unlined | Lined |
| Oil A | 0.8071 | 0.0565 |
| Oil B | 15.4500 | 0.1551 |

*Example 6*

One and a quarter ounce polyethylene bottles were lined with the composition of Example 1 and were cured at 190° F. for ninety minutes. These bottles and similar unlined bottles were filled with peppermint oil and equal portions thereof were stored at 70° F. and 100° F. for periods of 25 and 35 days. The average weight changes exhibited are set forth below:

| Average Weight Loss | 70° F. | | 100° F. | |
|---|---|---|---|---|
|  | Unlined | Lined | Unlined | Lined |
| 25 days | −0.3565 | +0.0356 | −3.6179 | −0.2556 |
| 35 days | −0.5338 | +0.0465 | −4.8853 | −0.6777 |

*Example 7*

Four ounce polyethylene bottles were manually lined as in Example 1 and the linings were cured at 190° F. for 90 minutes. These bottles and unlined bottles were filled with a liquid cleansing cream in the form of an oil-in-water emulsion. The filled bottles were stored at temperatures of 70° F. for a period of 89 days. At the end of 6 days, the unlined bottles collapsed and exhibited a greasy outer surface. No collapse was noted in any of the lined bottles and the exterior surfaces of the unlined bottles were free from grease at the end of 47 days. The unlined bottles exhibited a 47 day average weight loss of 1.885 grams while the lined bottles exhibited an 0.0012 gram weight loss.

*Example 8*

Four ounce polyethylene bottles were lined and the linings were cured as in Example 1. These bottles and similar unlined bottles were filled with a commercial baby oil and were stored at a temperature of 120° F. After 43 hours the unlined control bottles collapsed. No collapse or oiliness of surface was noted in the lined bottles at the end of 24 days.

*Example 9*

One and one-quarter ounce polyethylene bottles were interiorly spray coated with the composition of Example 1. These bottles and similar unlined bottles were filled with a dry fly oil composed of mineral oil, petroleum oil and anise oil and were stored at 100° F. for 28 days. The unlined control bottles collapsed, while their exterior surfaces were greasy, and exhibited the odor of anise. The lined bottles exhibited no collapse, their outer surfaces were normal in appearance and exhibited no anise odor.

*Example 10*

Four ounce polyethylene bottles were lined with the composition of Example 1 and were similarly cured. Twenty-five of these bottles and three similar unlined bottles were filled with a medicinal mineral oil and placed in an oven maintained at 160° F. At the end of four hours, the three unlined bottles began to collapse. At the end of 24 hours all the unlined bottles were severely collapsed and their surfaces were oily. The lined bottles showed neither collapse nor oily surface after 120 hours.

*Example 11*

Strips of polystyrene sheeting were coated with the composition of Example 1 and the coating was cured at 160° F. for one hour. Hexane, toluene, methyl ethyl ketone and carbon tetrachloride were individually applied to the coated surface of samples of the coated sheeting and to uncoated polystyrene sheeting and the samples allowed to stand. No change could be seen in the coated surfaces as a result of the subsequently applied solvent. All four solvents caused bubbling and swelling of the uncoated polystyrene sheets.

*Example 12*

Two-ounce Boston round-type bottles were blow molded from polymethylene (Koppers' Super Dylan, Type 6200) and were hand lined as in Example 1. Several of these bottles were filled with 25 grams of a perfume containing 96 parts of 39C alcohol and 4 parts of essential oil (40R–7035) and equipped with aerosol caps. Freon was introduced through the cap valve until a gauge pressure of 25 p. s. i. was obtained. These aerosol containers were then stored at 73.4° F. and 50% relative humidity for 30 days. The bottles exhibited an average daily weight loss of 0.0016 gram, thus establishing the utility of the liner of the invention in plastic aerosol bottles containing alcohol and essential oils.

*Example 13*

Lining solutions were prepared having the following proportions:

| Solution | 1 | 2 | 3 | 4 | 5 | 6 | 7 |
|---|---|---|---|---|---|---|---|
| Urea - formaldehyde resin[1] (g.) | 100 | 48 | 40 | 42 | 10.5 | 6 | 4 |
| Vinyl resin[1](g.) | 100 | 24 | 13.3 | 10.5 | 42 | 30 | 40 |
| MEK (ml.) | 275 | 100 | 50 | 30 | 80 | 72.5 | 77.5 |
| Toluene (ml.) | 255 | 100 | 50 | 30 | 30 | 72.5 | 77.5 |

[1] The resins employed in Example 1.

Several four-ounce Boston round polyethylene bottles were hand lined with each of the above coating solutions and the lining was cured for 90 minutes at 190° F. The bottles were filled with mineral oil, sealed, and stored at room temperature (73° F.) for 12 days. No surface oiliness or bottle collapse was noted in any of the bottles at the end of this period of time.

If the lined or coated articles of the invention are produced by spray coating, it is preferred to employ the following composition:

|  |  | Grams | Grams solids |
|---|---|---|---|
| Vinyl copolymer | 430 grams | 430 | 430 |
| Urea-formaldehyde resin[1] | 430 ml | 438 | 262 |
| Methyl ethyl ketone | 1,270 ml | 1,020 | |
| Toluene | 1,100 ml | 952 | |
|  |  | 2,840 | 692 |

[1] Uformite F240.

This composition has a solids concentration of about 24%.

For manually lining or coating plastic surfaces in accordance with the invention, it is preferred to employ:

|  | | Grams | Grams solids |
|---|---|---|---|
| Vinyl copolymer | 100 grams | 100 | 100 |
| Urea-formaldehyde resin[1] | 100 ml | 102 | 61 |
| Methyl ethyl ketone | 250 ml | 201 | |
| Toluene | 200 ml | 173 | |
|  |  | 576 | 161 |

[1] Uformite F240.

This composition has a solids concentration of about 28%.

While the amount of solvent dilution of the coating composition is a matter of choice, depending upon the method of coating and the type of apparatus employed, it is generally preferred that the solids content fall between about 10 to 50% for best results. While methyl ethyl ketone and toluene have been employed as a preferred solvent mixture, other equivalent solvents may be employed such as acetone, methyl isobutyl ketone, benzene and xylene. Solvent mixtures of ketones and cyclic hydrocarbon solvents are preferred.

From the foregoing examples, it is apparent that the coated or lined surfaces of this invention exhibit markedly decreased permeation by many commercially employed fluids. Moreover, the coated surfaces of the invention are additionally beneficial in preventing passage of gases, such as oxygen, through the plastic substrate. Consequently, synthetic resin containers, and particularly polyethylene containers and bottles, may in accordance with the invention be satisfactorily employed to package such materials or compositions containing these materials.

Although in the examples particular emphasis has been placed on the popular polyethylene bottle and, to a lesser extent, polystyrene containers and articles, it is intended that this invention also broadly include the application of a coating or lining or a coating composition of the present invention to surfaces of other non-polar synthetic resinous articles which are permeable to organic fluids. The invention is broadly applicable to plastic articles or containers fabricated from all types of thermo-plastic or thermo-setting resins. More specifically, the invention is applicable to articles or containers fabricated from such materials as polyethylene, including conventional polyethylene and the so-called new type low temperature polyethylene, such as Ziegler polyethylene, polymethylene or polyethylene substantially free of branched chains, polyethylene terephthalate, polytetrafluoroethylene; nylon, acetate copolymers, ethylene-polyvinyl acetate copolymers, epoxy resins, coumarone resins; indene resins; acetylene polymers, including their halogenated derivatives; polymers of olefin hydrocarbons other than ethylene, including polymers of isoprene, butadiene and their homologues, and halogen-substituted derivatives thereof; olefin-sulfur dioxide resins; phenol-aldehyde resins; aldehyde resins; furfural resins; ketone resins; urea-formaldehyde type resins, including thiourea formaldehyde, melamine formaldehyde, and dicyandiamide-formaldehyde resins; amine-aldehyde resins; sulfonamide-aldehyde resins; nitro resins; resins from such nitrogen-containing materials as hydrazine and related substances, pyrazoles, pyridine, quinoline, pyrrole, indole, and carbazole; condensation polyester resins, including resins obtained from polyhydric alcohols and polybasic acids, and from hydroxy acids; polyamide resins and derivatives thereof; mixed polyester-polyamide resins; polyether resins; polyvinyl ethers; polyvinyl alcohols; polyvinyl esters; rubber and its derivatives; cellulose esters and cellulose ethers. All of these plastic materials may be used with any of the usual modifying agents including plasticizers, pigments, fillers, dyes and materials which combine chemically with the polymer ingredients either during formation of the polymer or during an after treatment. Thus, surfaces and containers fabricated from copolymers, interpolymers and mixtures of polymers may be advantageously rendered less permeable to organic fluids by application of a coating or lining of a coating composition of this invention.

As indicated, containers or bottles may, in accordance with the invention, be coated or lined on either the interior or exterior surfaces. Where the problem involved is merely the prevention of moisture from entering the product to be packaged or to prevent gases from the atmosphere from contacting the contents of the container, an external coating is satisfactory. However, from the standpoint of the permeation of a liquid within a container outwardly through the container walls, it is greatly preferred to employ an interior lining or coating. As shown in the examples, the permeation of the liquid into the container wall causes considerable swelling or distortion of the container and, in some cases, actually causes collapse of the physical structure. Moreover, with an external coating, an ingredient of the fluid content may be essential, although quantitatively small, and consequently such ingredient may be lost by absorption in the container wall even though the ingredient does not escape from the bottle itself. This latter situation is especially important where the containers are employed for skin lotions, perfumes, and the like, in which the essential oil fraction governing the perfume odor is relatively small. Accordingly, despite the proportionally greater difficulty of applying a lining to the container's interior, the advantages of such an inner lining are such that it is preferred. In some instances it may be desirable to apply both an interior and exterior lining.

The mechanical method of applying the coatings or linings to the container surfaces are well known to the art and do not constitute a part of the present invention. Specific details of the operation and functioning of spray coating units may be found in Paasche Patents 2,547,884, 2,059,706 and 2,069,844.

Since modifications of the disclosed invention will be apparent to those skilled in the art, it is intended that the invention be limited only by the scope of the appended claims.

I claim:

1. A sealable synthetic resin container having a surface characterized by enhanced resistance to permeation by organic fluids, said surface having an adherent coating of a composition consisting essentially of a copolymer of vinyl chloride, vinyl acetate and vinyl alcohol and an alcoholic type urea-formaldehyde resin.

2. A sealable synthetic resin container having a surface characterized by enhanced resistance to permeation by organic fluids, said surface having an adherent coating of a composition consisting essentially of substantially equal parts by weight of a copolymer of vinyl chloride, vinyl acetate and vinyl alcohol and an alcoholic type urea-formaldehyde resin.

3. A sealable synthetic resin container having a surface characterized by enhanced resistance to permeation by organic fluids, said surface having an adherent coating of a composition consisting essentially of a copolymer of about 75 to about 95% vinyl chloride, about 2 to about 10% vinyl acetate and about 3 to about 15% of vinyl alcohol and an alcoholic type urea-formaldehyde resin.

4. A sealable synthetic resin container having a surface characterized by enhanced resistance to permeation by organic fluids, said surface having an adherent coating of a composition consisting essentially of by weight from about 20 to 90% of a copolymer of about 75 to about 95% vinyl chloride, about 2 to about 10% vinyl acetate and about 3 to about 15% of vinyl alcohol and about 80 to 10 parts of an alcoholic type urea-formaldehyde resin.

5. A sealable synthetic resin container having a surface characterized by enhanced resistance to permeation by organic fluids, said surface having an adherent coating of a composition consisting essentially of substantially equal parts by weight of a copolymer of 75 to 95% vinyl chloride, 2 to 10% of vinyl acetate and 3 to 15% of vinyl alcohol and an alcoholic type urea-formaldehyde resin.

6. A sealable polyethylene container having a surface characterized by enhanced resistance to permeation by organic fluids, said polyethylene surface having an adherent coating of a composition consisting essentially of a copolymer of vinyl chloride, vinyl acetate and vinyl alcohol and an alcoholic type urea-formaldehyde resin.

7. A sealable polyethylene container having a surface characterized by enhanced resistance to permeation by organic fluids, said polyethylene surface having an adherent coating of a composition consisting essentially of substantially equal parts by weight of a copolymer of vinyl chloride, vinyl acetate and vinyl alcohol and an alcoholic type urea-formaldehyde resin.

8. A sealable polyethylene container having a surface characterized by enhanced resistance to permeation by organic fluids, said polyethylene surface having an adherent coating of a composition consisting essentially of a copolymer of 75 to 95% vinyl chloride, 2 to 10% vinyl acetate and 3 to 15% of vinyl alcohol and an alcoholic type urea-formaldehyde resin.

9. A sealable polyethylene container having a surface characterized by enhanced resistance to permeation by organic fluids, said polyethylene surface having an adherent coating of a composition consisting essentially of by weight from about 20 to 90 parts of a copolymer of 75 to 95% vinyl chloride, 2 to 10% vinyl acetate and 3 to 15% of vinyl alcohol and about 80 to 10 parts of an alcoholic type urea-formaldehyde resin.

10. A sealable polyethylene container having a surface characterized by enhanced resistance to permeation by organic fluids which comprises a polyethylene surface having an adherent coating of a composition consisting essentially of substantially equal parts by weight of a copolymer of 75 to 95% vinyl chloride, 2 to 10% vinyl acetate and 3 to 15% of vinyl alcohol and an alcoholic type urea-formaldehyde resin.

11. A polyethylene bottle of enhanced resistance to permeation by organic fluids, a surface of said bottle having an adherent coating of a composition consisting essentially of a copolymer of vinyl chloride, vinyl acetate and vinyl alcohol and an alcoholic type urea-formaldehyde resin.

12. A polyethylene bottle of enhanced resistance to permeation by organic fluids, a surface of said bottle having an adherent coating of a composition consisting essentially of substantially equal parts by weight of a copolymer of vinyl chloride, vinyl acetate and vinyl alcohol and an alcoholic type urea-formaldehyde resin.

13. A polyethylene bottle of enhanced resistance to permeation by organic fluids, a surface of said bottle having an adherent coating of a composition consisting essentially of a copolymer of 75 to 95% vinyl chloride, 2 to 10% vinyl acetate and 3 to 15% of vinyl alcohol and an alcoholic type urea-formaldehyde resin.

14. A polyethylene bottle of enhanced resistance to permeation by organic fluids, a surface of said bottle having an adherent coating of a composition consisting essentially of by weight about 20 to 90 parts of a copolymer of 75 to 95% vinyl chloride, 2 to 10% vinyl acetate and 3 to 15% of vinyl alcohol and about 80 to 10 parts of an alcoholic type urea-formaldehyde resin.

15. A polyethylene bottle of enhanced resistance to permeation by organic fluids, a surface of said bottle having an adherent coating of a composition consisting essentially of substantially equal parts by weight of a copolymer of 75 to 95% vinyl chloride, 2 to 10% vinyl acetate and 3 to 15% vinyl alcohol and an alcoholic type urea-formaldehyde resin.

16. A sealed synthetic resin container having a surface characterized by enhanced resistance to permeation by organic fluids, said surface having an adherent coating of a composition consisting essentially of a copolymer of vinyl chloride, vinyl acetate and vinyl alcohol and an alcoholic type urea-formaldehyde resin.

17. A sealed synthetic resin container having a surface characterized by enhanced resistance to permeation by organic fluids, said surface having an adherent coating of a composition consisting essentially of from about 20 to 90% of a copolymer of about 75 to about 95% vinyl chloride, about 2 to about 10% vinyl acetate and about 3 to about 15% of vinyl alcohol and about 80 to 10 parts of an alcoholic type urea-formaldehyde resin.

18. A sealed polyethylene container having a surface characterized by enhanced resistance to permeation by organic fluids, said polyethylene surface having an adherent coating of a composition consisting essentially of a copolymer of vinyl chloride, vinyl acetate and vinyl alcohol and an alcoholic type urea-formaldehyde resin.

19. A sealed polyethylene container having a surface characterized by enhanced resistance to permeation by organic fluids, said polyethylene surface having an adherent coating of a composition consisting essentially of a copolymer of 75 to 95% vinyl chloride, 2 to 10% vinyl acetate and 3 to 15% of vinyl alcohol and an alcoholic type urea-formaldehyde resin.

20. A sealed polyethylene container having a surface characterized by enhanced resistance to permeation by organic fluids, said polyethylene surface having an adherent coating of a composition consisting essentially of from about 20 to 90 parts of a copolymer of 75 to 95% vinyl chloride, 2 to 10% vinyl acetate and 3 to 15% of vinyl alcohol and about 80 to 10 parts of an alcoholic type urea-formaldehyde resin.

References Cited in the file of this patent

UNITED STATES PATENTS

| | | |
|---|---|---|
| 2,335,958 | Parker | Dec. 7, 1943 |
| 2,476,627 | Rote | July 19, 1949 |
| 2,512,726 | Penn | June 27, 1950 |
| 2,628,208 | Loukomsky | Feb. 10, 1953 |
| 2,690,407 | Pessel | Sept. 28, 1954 |
| 2,698,239 | Alles | Dec. 28, 1954 |